(12) United States Patent
Lu et al.

(10) Patent No.: US 7,538,507 B2
(45) Date of Patent: May 26, 2009

(54) SYSTEM AND METHOD FOR TRANSIENT-BASED MOTOR SPEED ESTIMATION WITH TRANSIENT EXCITATION

(75) Inventors: Haihui Lu, Shanghai (CN); Thomas A. Nondahl, Wauwatosa, WI (US); David M. Messersmith, Kenosha, WI (US)

(73) Assignee: Rockwell International Technologies, Inc., Mayfield Heights, OH (US)

( * ) Notice: Subject to any disclaimer, the term of this patent is extended or adjusted under 35 U.S.C. 154(b) by 125 days.

(21) Appl. No.: 11/741,728

(22) Filed: Apr. 28, 2007

(65) Prior Publication Data
US 2007/0247099 A1 Oct. 25, 2007

Related U.S. Application Data

(63) Continuation of application No. 11/379,887, filed on Apr. 24, 2006, now Pat. No. 7,227,326.

(51) Int. Cl.
*G01P 3/00* (2006.01)
(52) U.S. Cl. .................................. 318/461; 324/178
(58) Field of Classification Search ......... 318/461–465, 318/490, 727, 798–805, 807–811; 324/160–166, 324/177–180
See application file for complete search history.

(56) References Cited

U.S. PATENT DOCUMENTS

| | | | | |
|---|---|---|---|---|
| 3,585,486 A * | 6/1971 | Gyugyi et al. | ............... | 363/161 |
| 3,852,654 A * | 12/1974 | Gyugyi et al. | ............... | 363/161 |
| 3,965,430 A * | 6/1976 | Brandt | ........................ | 327/116 |
| 4,348,625 A * | 9/1982 | Sharp | .......................... | 318/757 |
| 4,376,970 A * | 3/1983 | Ilseman et al. | ................. | 700/56 |
| 4,771,223 A * | 9/1988 | Armstrong et al. | .......... | 318/809 |
| 4,864,284 A * | 9/1989 | Crayton et al. | .............. | 340/635 |
| 5,187,419 A * | 2/1993 | DeLange | .................... | 318/805 |
| 5,225,749 A * | 7/1993 | Watanabe | .................... | 318/268 |
| 5,245,256 A * | 9/1993 | Cassat et al. | ........... | 318/400.35 |
| 5,270,632 A | 12/1993 | Hirota et al. | | |
| 5,366,303 A * | 11/1994 | Barrus et al. | ................. | 400/234 |
| 5,446,360 A * | 8/1995 | Son et al. | ..................... | 318/727 |
| 5,548,197 A * | 8/1996 | Unsworth et al. | ........... | 318/757 |
| 5,631,999 A * | 5/1997 | Dinsmore | ................... | 388/805 |
| 5,744,723 A | 4/1998 | Piety | | |
| 5,828,199 A | 10/1998 | Tajima et al. | | |
| 6,414,463 B1 | 7/2002 | Griepentrog et al. | | |

(Continued)

OTHER PUBLICATIONS

A. Ferrah, P.J. Hogben-Iing, K.J. Bradley, G.M. Asher, and M.S. Woolfson, "The Effect of Rotor Design on Sensorless Speed Estimation Using Rotor Slot Harmonics Identified by Adaptive Digital Filtering Using the Maximum Likelihood Approach," in Conf. Rec. IEEE-IAS Annual Meeting, No. 32, New Orleans, USA, Oct. 1997, pp. 128-135.

(Continued)

*Primary Examiner*—Bentsu Ro
(74) *Attorney, Agent, or Firm*—Fay Sharpe LLP; Alexander R. Kuszewski (57) ABSTRACT

Control systems and speed estimation systems are presented having a transient-based speed estimation system that provides a rotor speed estimate based on a measured speed-related motor transient signal, and a transient excitation system which selectively modifies at least one switch control signal to excite the measured motor transient.

16 Claims, 8 Drawing Sheets

U.S. PATENT DOCUMENTS

| | | | |
|---|---|---|---|
| 6,541,928 B2 * | 4/2003 | Eroglu et al. | 318/400.35 |
| 6,640,196 B1 | 10/2003 | Unsworth et al. | |
| 6,713,978 B2 | 3/2004 | Parlos et al. | |
| 6,864,659 B2 * | 3/2005 | Ratz et al. | 318/772 |
| 7,084,604 B2 | 8/2006 | Salomaki | |
| 2006/0192520 A1 | 8/2006 | Yin et al. | |
| 2006/0192522 A1 | 8/2006 | Kerkman et al. | |

OTHER PUBLICATIONS

Michael W. Degner, Associate Member, IEEE, and Robert D. Lorenz, Fellow, IEEE, "Position Estimation in Induction Machines Utilizing Rotor Bar Slot Harmonics and Carrier-Frequency Signal Injection", IEEE Transactions on Industry Applications, vol. 36, No. 3, May/Jun. 2000.

Jimmie J. Cathey, Ralph K. Cavin, III, A.K. Ayoub, "Transient Load Model of an Induction Motor", IEEE Trans. on Power Apparatus and Systems, vol. 92, pp. 1399-1406, Jul./Aug. 1973.

Paul C. Krause, Oleg Wasynczuk & Scott D. Sudhoff, "Analysis of Electric Machinery", ISBN 0-7803-1101-9, IEEE Press, New York, N.Y. 1995, pp. 298-303, 312, and 313.

* cited by examiner

SYSTEM AND METHOD FOR TRANSIENT-BASED MOTOR SPEED ESTIMATION WITH TRANSIENT EXCITATION

REFERENCE TO RELATED APPLICATION

This application is a continuation of, and claims priority to and the benefit of, co-pending U.S. patent application Ser. No. 11/379,887, filed Apr. 24, 2006, entitled SYSTEM AND METHOD FOR TRANSIENT-BASED MOTOR SPEED ESTIMATION WITH TRANSIENT EXCITATION, the entirety of which is hereby incorporated by reference.

FIELD OF THE INVENTION

The present invention relates generally to motor controls and more particularly to transient-based speed estimation for closed-loop motor control with transient excitation.

BACKGROUND OF THE INVENTION

In many industrial automation applications, it is desired to start and stop AC electric motors according to a specified speed profile. Motor control systems have been developed and employed to control speed and other aspects of motor performance during startup using variable frequency drives. Alternatively, induction motor systems often include softstarters to energize the stator windings during starting and stopping, with the soft startup controls being bypassed once the motor reaches the normal operating speed. To accurately control the motor speed during starting and stopping, it is necessary to measure or estimate the actual rotational speed of the rotor. Many motor control systems employ some form of tachometer or other sensor device mechanically coupled to the motor shaft to produce a feedback signal representing the motor speed, which can then be used in feedback control of the motor during starting, stopping, and steady-state operation. However, such external sensors add cost and weight and require maintenance. Therefore, sensorless systems have been proposed which utilize speed estimation apparatus to derive a speed estimate based on measured electrical motor signals. In certain proposed sensorless speed estimation approaches, the zero-crossing times of the stator winding currents are measured and the corresponding phase angle errors between consecutive zero-crossings are analyzed to produce a signal frequency which is ideally related to the rotor speed. However, experimentation has shown that the detected signal is only strong enough for reliable speed identification over a small portion of the speed range, and the measured signal is easily corrupted by power supply disturbances. Consequently, there is a need for improved motor control apparatus and sensorless speed estimation techniques and systems for motor control applications, particularly for controlling motor speeds during starting and stopping.

SUMMARY OF INVENTION

One or more aspects of the invention are now summarized to facilitate a basic understanding of the invention, wherein this summary is not an extensive overview of the invention, and is intended neither to identify certain elements of the invention, nor to delineate the scope thereof. The primary purpose of the summary, rather, is to present some concepts of the invention in a simplified form prior to the more detailed description that is presented hereinafter. The present invention relates to AC motor control systems, startup controllers, and motor control methodologies in which the motor speed is estimated according to measured motor transients, and the motor transients are excited or re-excited so as to maintain the ability to continue sensorless speed estimation throughout the motor speed range. In this manner, the measured transient signal is effectively amplified or re-energized for robust speed estimation essentially throughout the motor speed range by introduction of transients into the AC motor and thus reduces the susceptibility of the speed estimate to power supply disturbances. The transient excitation may be employed in conjunction with any number of measurable transient signals that relate to the motor speed, whereby the techniques of the present invention may find particular utility in controlling AC induction motors using virtually any form of transient-based speed estimation for closed-loop type motor control during starting, stopping and steady-state regulated operation.

In accordance with one or more aspects of the present invention, AC motor switching systems and motor speed control systems are provided for operating AC induction motors. The switching system comprises switching devices that selectively couple motor leads to an AC power source according to switch control signals. The motor speed control system includes a motor controller which provides an output to control the motor speed during starting and stopping according to a desired speed profile and according to a rotor speed estimate, and a switch control system provides the switch control signals during starting and stopping according to the motor controller output. The motor speed control system also includes a transient excitation system which operates to selectively modify at least one switch control signal to excite a motor transient, and a transient-based speed estimation system receiving feedback from the switching system and providing the rotor speed estimate at least partially according to the feedback signal or value. In one embodiment, the transient-based speed estimation system measures one or more transient speed-related signals associated with the motor transient, and determines the rotor speed estimate based at least in part on the transient speed-related signal.

The speed estimation system may measure any type of speed-related signal or signals, including but not limited to phase error, phase lag, peak current, voltage integral, motor winding voltage, switching device voltage, and voltage zero crossing signals. Any form of transient excitation may be used, wherein certain embodiments involve modification of the switching control signal pulse streams. In certain examples, the transient excitation system selectively removes individual pulses or pairs of pulses from the switching control signal pulse stream to excite the motor transient or selectively modifies spacings between select pulses in the switching control signal to excite the motor transient. The pulse stream modifications, moreover, may be performed according to a modulation waveform, for example, a sine wave, a square wave, a sawtooth wave, etc., or the modification may be based at least partially on the rotor speed estimate. In certain implementations, moreover, the system may also provide a rotor flux initialization system that selectively initializes the rotor flux in the motor prior to activating the transient excitation system.

Other aspects of the invention relate to methods for controlling motor speed during starting and stopping, which comprise providing switch control signals to a switching system for selectively coupling motor leads to an AC power source to control the motor speed, selectively modifying one or more of the switch control signals to excite a motor transient, measuring a transient speed-related signal associated with the motor transient, and providing the rotor speed estimate at least partially according to the transient speed-related signal. In certain implementations, the selective modification of the switch control signals comprises selectively removing individual pulses from the switching control signal to excite the motor transient, or modifying spacings between select pulses in the switching control signal to excite the motor transient. The methods may further include selectively initializing rotor flux in the motor prior to selectively modifying the switch control signals. The transient excitation, moreover, may be done at any suitable time to allow acceptable measurement of the motor transient for speed estimation, for example, by periodically modifying the switch control signal to excite a motor transient or according to an amplitude of the measured transient speed-related signal.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention will be set forth in the following detailed description of the invention when considered in conjunction with the drawings, in which.

DETAILED DESCRIPTION OF THE INVENTION

Referring now to the figures, several embodiments or implementations of the present invention are hereinafter described in conjunction with the drawings, wherein like reference numerals are used to refer to like elements throughout, the invention is hereinafter illustrated and described in the context of speed control for a three-phase WYE connected induction motor, although the invention is not limited to the illustrated examples and can be employed in controlling AC motors of any number of phases, any winding configuration (WYE or DELTA) and any controller configuration (LINE or Inside-the-DELTA). The embodiments illustrated below facilitate closed-loop control of motor speed during starting and stopping using a transient-based speed estimate derived from speed-related motor transient signals without the need for external tachometers or other speed sensors, and can be implemented in any type of motor control apparatus to provide sensorless closed-loop speed control that is generally immune to power supply disturbances for implementing linear ramp or other desired speed control profile or operating mode, including but not limited to current limiting mode, soft start mode, current limit with kickstart mode, soft start with kickstart mode, etc., for both no load and loaded operation.

Figure 1:
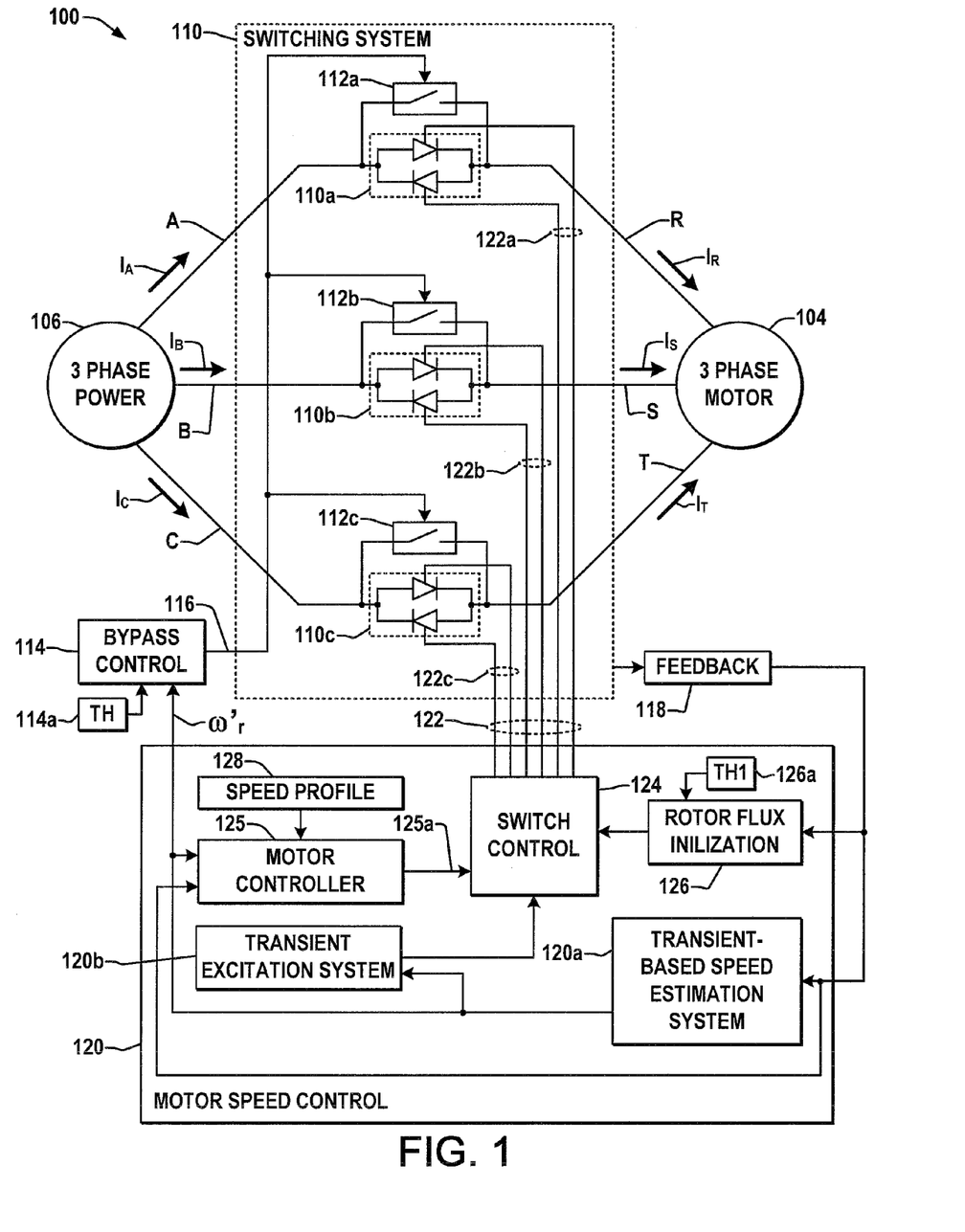
FIG. 1 is a detailed schematic diagram illustrating an exemplary motor control system with a motor speed control system for driving an induction motor, including a transient-based speed estimation system and a transient excitation system according to one or more aspects of the present invention.

Referring initially to FIG. 1, an exemplary motor control system 100 is provided with a motor speed control system 120 having a transient-based speed estimation system 120a and a transient excitation system 120b in accordance with one or more aspects of the invention. The motor speed control system 120 also comprises a switch control circuit or system 124, and a motor controller 125 providing a controller output 125a to the switch control system 124 for speed control according to a speed profile 128, such as a linear ramp in one example. In addition, the exemplary motor speed controller 120 includes an optional rotor flux initialization system 126. The various components of the motor speed control system 120 can be implemented in any suitable hardware, software, or combinations thereof. The motor control system 100 selectively provides power to a polyphase induction motor 104 from a three phase AC power source 106 by controlled operation of a switching system 110 with three pairs of SCR switching devices 110a, 110b, 110c coupled between power supply lines A, B, and C of the AC power source 106 and leads R, S, and T of the motor 104, respectively. Although illustrated as SCR type switches 110a-110c, any type of electrical switching devices may be used in the system 110 and for the bypass switches 112. The individual switching devices 110 are operated according to a corresponding switch control signal 122 to selectively couple a corresponding motor lead to the AC power source such that portions of the power supply voltages are applied to the motor windings to generate/create motor phase currents $I_R$, $I_S$, and $I_T$. The phase couplings in the illustrated system 100 also include optional bypass switches 112a, 112b, and 112c to selectively bypass the switch pairs 110a, 110b, and 110c after startup by connecting the motor leads R, S, and T directly to the AC power source lines A, B, and C according to a bypass control signal 116 from a bypass control component 114 when the speed estimate ω'r reaches a threshold value 114a, although the bypass features of the illustrated control system 100 are not strict requirements of the present invention.

The switching system 110 is operated by the motor speed control system 120 for controlling the motor speed during starting, wherein the control system 120 comprises inter alia a transient-based speed estimation system 120a for providing a rotor (motor) speed estimate ω'r according to one or more feedback signals or values 118 (e.g., measured voltages, currents, etc.) from the switching system 110. The measured motor feedback signals 118 include transient information that can be correlated to motor speed, whereby the speed estimation system 120a is operable to extract one or more types of speed-related transient signals from the feedback 118, in order to derive or otherwise provide the speed estimate ω'r as illustrated and described in greater detail below. The inventors have appreciated that certain speed-related signals are transient in character and decay over time, and/or are reliably discernable over only a portion of the motor speed range. To address this difficulty, the exemplary motor speed controller 120 includes a transient excitation system 120b operatively coupled with the switch control system 124 to selectively modify one or more of the switch control signals 122 so as to excite or re-excite the motor transient for improved measurability of the transient speed-related feedback signal(s) from the feedback 118 by the speed estimation system 120a. This transient excitation feature of the invention can thus be advantageously employed to help ensure that the transient-based estimation system 120a can reliably obtain measurable speed-related signal information from the feedback 118 throughout the entire speed range of the motor 104, even in the presence of power source disturbances. The motor speed control system 120 and the various components thereof, including the transient-based speed estimation and excitation systems 120a and 120b, respectively, can be implemented as any suitable hardware, software, and/or combinations thereof.

The exemplary control system 120 also provides a switch control system or circuit 124 with circuitry and/or other suitable hardware or software to provide a plurality of switch control signals 122a, 122b, 122c to control operation of the switching devices 110a, 110b, and 110c, respectively, during starting and stopping of the motor 104 according to one or more control output signals 125a from the motor controller 125. The motor controller may be implemented as any suitable controller or regulator 125 by which the motor 104 is controlled according to feedback 118 and an estimated motor speed signal ω'r from the speed estimation system 120a. In addition, the motor controller 125 can be operated in a number of different modes or control schemes, including controlling torque, speed, position, etc., wherein the exemplary motor controller 125 operates in the illustrated examples to control the speed of the induction motor 104 during starting and stopping according to a user defined speed profile 128, although the particular motor control scheme or application is not a strict requirement of the present invention. The switch control system 124 is operative during motor starting and stopping (and optionally thereafter) to provide appropriate switching signals 122 to operate the motor 104 in accordance with the motor control output(s) 125a, wherein the switch controls 124 may provide pulse width modulation (PWM) or other forms of switch timing control. The switch control signals 122, moreover, may be selectively modified by the transient excitation system 120b to selectively excite or re-excite one or more motor transients as set forth in greater detail below.

The speed estimation system 120a operates in generally continuous fashion to provide the speed estimate ω'r to the motor controller 125 for comparison to the desired speed profile 128 at any given point during starting and stopping. In the illustrated system 100, the speed estimation system 120a measures at least one transient speed-related signal in the feedback 118, where the transient speed-related signal is associated with a motor transient. The system 120a then determines the rotor speed estimate ω'r at least in part according to the transient speed-related signal. The motor control aspects of the present invention are hereinafter illustrated in the context of speed estimation based on one or more speed-related transient phase error signals determined according to the firing and zero-crossing points in the motor phase voltage signals, although the invention is not limited to use of any particular speed-related signal for speed estimation. In this regard, the transient-based speed estimation may be done using any suitable speed-related signal, including but not limited to a phase error signal, a phase lag signal, a peak current signal, a voltage integral signal, a motor winding voltage signal, a switching device voltage, and a voltage zero crossing signal.

Figure 2:
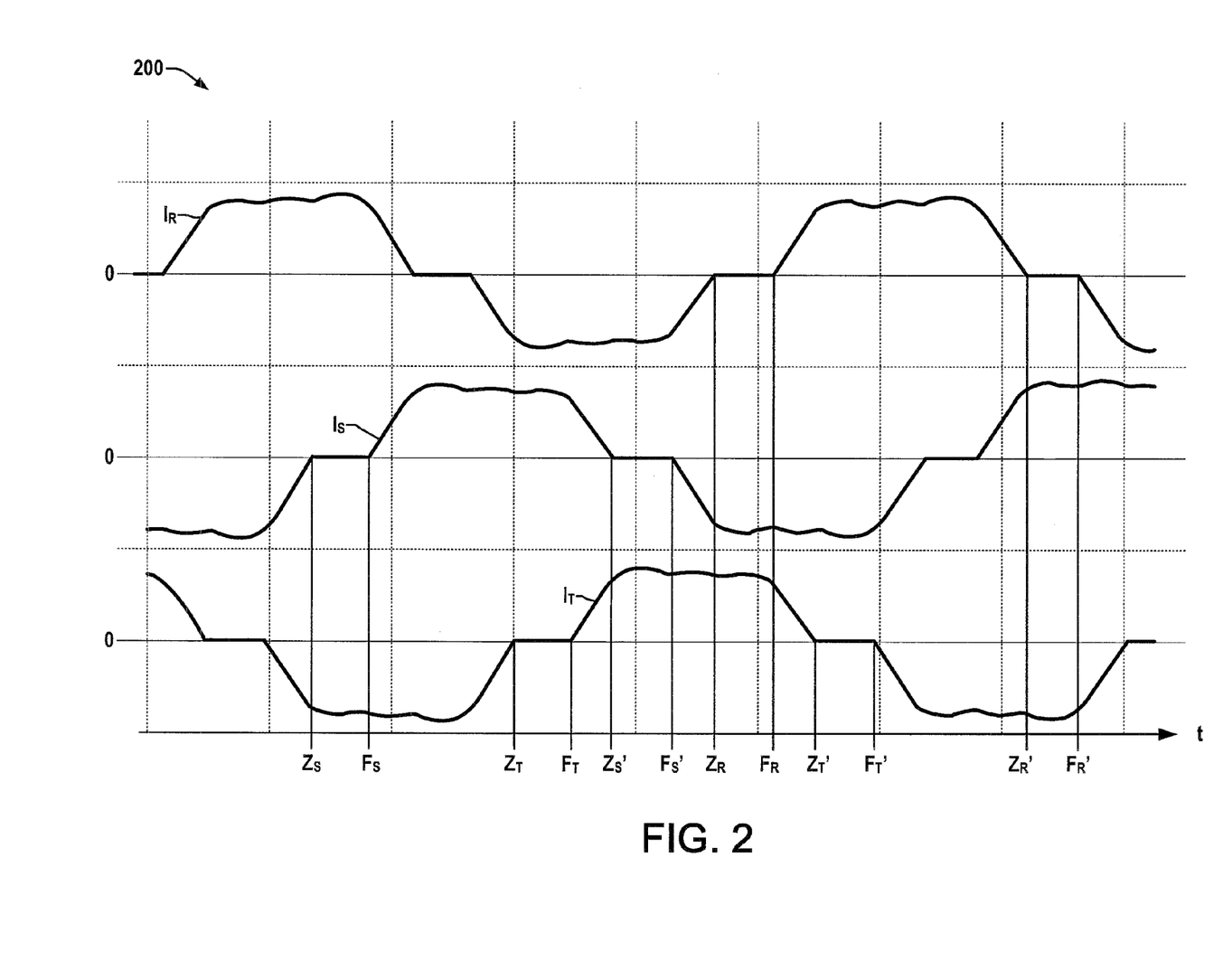
FIG. 2 is a graph showing three phase current curves in the motor of FIG. 1.
Figure 3:
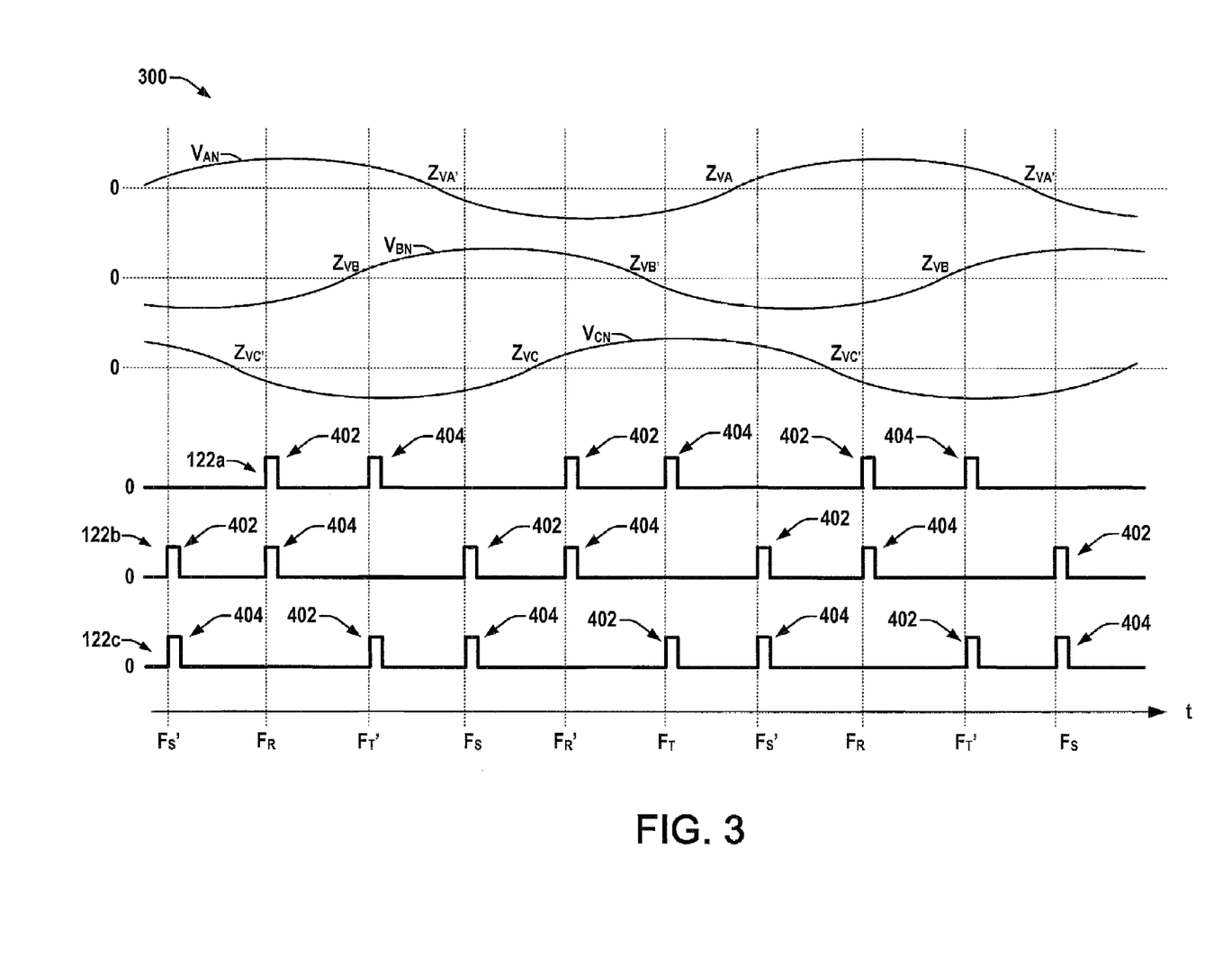
FIG. 3 is a graph illustrating three line-to-neutral power source voltage curves and switch control signals in the system of FIG. 1.

Referring also to FIGS. 2 and 3, a plot 200 in FIG. 2 illustrates three motor phase current curves $I_S$, $I_R$, and $I_T$ in the motor control system 100 of FIG. 1, and FIG. 3 shows a plot 300 illustrating three line-to-neutral power source voltage curves $V_{AN}$, $V_{BN}$, and $V_{CN}$, and corresponding switch control signals 122a, 122b, and 122c, respectively, in the system 100 FIG. 1. The motor current waveforms $I_S$, $I_R$, and $I_T$ in FIG. 2 are the result of selectively connecting the power source phases A, B, and C to the motor leads R, S, and T by controlled provision of the switching signals 122a, 122b, and 122c to the switching system 110, respectively. As best seen in FIG. 3, the exemplary switch control system 124 provides the switching signals 122 as a series or stream of pulses, and in this example, as a series or pulse pairs including a first (leading) pulse 402 and a second (trailing) pulse 404 in each pulse pair, with the first pulse 402 beginning at the firing point ($F_R$, $F_S$, $F_T$, $F_R'$, $F_S'$, and $F_T'$). The pulse pairs are repeated as a series of pulse pairs with the firing angle (the angle between the beginning of the positive portion of the corresponding supply phase voltage waveform and the firing time F) varying in closed-loop fashion according to the output 125a (FIG. 1) from the motor controller 125.

In one possible embodiment, the transient-based speed estimation system 120a measures the feedback phase current signals 118 ($I_S$, $I_R$, and $I_T$ in FIG. 2) or the switching device voltages and determines the motor speed ω'r using the zero-crossing points. In this case, an error signal set is generated and analyzed in the time domain, and a speed-related signal frequency is then produced in the speed estimation system 120a. In the graph 200 of FIG. 2, the positive motor current zero-crossings (the times when the corresponding SCR switching devices 110 are turned off) for the phases R, S, and T are indicated as $Z_R$, $Z_S$, and $Z_T$, respectively, and the corresponding zero-crossings associated with the opposite (e.g., negative) current direction are denoted as $Z_R'$, $Z_S'$, and $Z_T'$. Similarly, the firing points for the positive and negative half-cycles are indicated as $F_R$, $F_S$, and $F_T$ and $F_R'$, $F_S'$, and $F_T'$, respectively, representing the controlled time at which the SCRs are initially turned on (e.g., via the leading pulses 402) according to the switching signals 122 from the switch control system 124.

Certain phase-angle type transient speed-related signals can be derived from measurement of the times $Z_R$, $Z_S$, $Z_T$, $Z_R'$, $Z_S'$, $Z_T'$, $F_R$, $F_S$, $F_T$, $F_R'$, $F_S'$, and $F_T'$. In one example, a 60 degree detection technique can be used, in which the time differences between two adjacent zero-crossings of the three-phase motor currents is obtained and ⅙ of the supply period T is subtracted to obtain a phase error value. In this 60 degree detection technique, phase interval error signals in time units can be developed as (1) $Z_S'-Z_T-T/6$, (2) $Z_R-Z_S'-T/6$, (3) $Z_T'-Z_R-T/6$, etc. The frequency of the phase error values has been found to be indicative of the rotor speed ω'r (e.g., the phase error signal frequency can be correlated to the slip frequency) and the speed estimation system 120a provides the estimate ω'r accordingly. In another possible implementation, a 180 degree detection may be used, by measuring and computing data points (1) $Z_R'-Z_R-T/2$, (2) $Z_S'-Z_S-T/2$, (3) $Z_T'-Z_T-T/2$, etc., wherein the concept of the 180 degree detection may be extended to 360 degree detection, 540 degree detection, 720 degree detection, etc., with higher degrees being preferred in high speed ranges to increase the signal magnitude.

Other possible speed-related signals can be derived from the feedback 118 and used for motor speed estimation in accordance with the invention, including but not limited to phase lag, peak current, voltage integral, motor winding voltage, switching device voltage, and voltage zero crossing signals, for example. Phase lag signals can be generated for deriving the estimated rotor speed ω'r, wherein the speed estimation system 120a measures the time delay between the supply voltage zero-crossings $Z_V$ and the shutoff Z on each individual phase (e.g., $Z_R$-$Z_{VR}$, $Z_S$-$Z_{VS}$, $Z_T$-$Z_{VT}$, etc.). In this technique, these individual delay values are subtracted from the average delay, and the resulting points create a signal having an AC component indicative of the rotor speed ω'r, wherein the average or the DC offset of the signal changes with the firing angle and with changes in the motor load.

Another transient speed-related signal that can be used by the speed estimation system 120a is a current amplitude signal, wherein the three-phase motor currents $I_R$, $I_S$, and $I_T$ of the feedback 118 are sampled at a sampling frequency, and the maximum absolute current value is determined. The resulting signal has a large DC component that varies with the firing angle, and which can be removed by taking the difference between the present signal and a past signal, wherein the interval employed between the past and present sample has an impact on the frequency spectrum of the revised current amplitude signal. In practice any delay can be used for this DC component removal to obtain a signal with a discernable frequency component indicative of the rotor speed ω'r. In one possible embodiment, multiples of one sixth the supply period are believed to yield a clear signal under ideal power supply conditions.

Yet another possible speed-related transient signal can be found in the integral of the motor terminal voltages, such as the integral of the line-to-neutral motor voltages. Using integration software or hardware integrator circuits in the speed estimator 120a, with the corresponding integrator output being reset at the start of the corresponding conduction (e.g., firing) time, the absolute value of the integral at the end of each SCR conduction period is sampled and used for speed calculation. In this regard, the inventors have found that the voltage integral signal includes a DC offset similar to that obtained in the raw current amplitude technique described above, and which may be removed in similar fashion by subtraction from a previous value. In the voltage integral technique, moreover, the inventors have found that errors may occur in the voltage integral signal when the firing angle is large and the motor current is small, wherein the current zero-crossing occurs around the center of the expected conduction period, at which point the measured voltage will generally not be same as the line voltage. In this technique, therefore, it may be preferable to avoid operating at that condition.

Other possible speed-related transient signals include motor winding voltage, switching device voltage, and voltage zero crossing signals. The motor winding voltage can be measured from the feedback 118 during the time when the SCR is off (e.g., during the "notch" period). In one implementation, this winding voltage is sampled once during each notch period, preferably at some non-zero time following the zero-crossing when the SCR switching device 110 turns off so as to avoid perturbations caused by operation of snubber circuits or other switching disturbances. In this technique, the absolute value of the motor winding voltages sampled at each notch period of all three phases can be used to determine a speed related signal, from which the rotor speed ω'r can be derived, with suitable DC offset removal performed in a manner similar to that described above in connection with the current amplitude signal approach.

Another speed-related transient signal can be found by measuring the voltage across the switching devices 110 (e.g., the voltage across the SCRs 110 in one implementation of the switching system 110) during the "notch" period when the device is turned off. In this case, the amplitudes of these voltage signals vary with a frequency corresponding to the rotor speed ω'r. The notch voltage may be sampled once during each notch period, preferably some non-zero time after the SCR is turned off to avoid measurements during any snubber-related oscillation in the measured voltage signal. The absolute values of the notch voltages can be sampled at each notch period of all three phases in one implementation so as to form a signal set to determine the slip speed in the speed estimation system 120a, with any DC component being removed by suitable techniques such as that described above for the current amplitude signal approach. The rotor speed ω'r can then be easily derived from the slip speed in the speed estimation system 120a.

Another speed-related transient signal can be derived from the measurements of the phase-to-phase voltage zero crossing times. In one example, a 180 degree detection technique can be used in which the time differences between two adjacent zero-crossings on each phase is obtained and one half the average supply period T is subtracted to obtain a speed-related signal. In this technique a speed-related signal can be developed as: (1) $Z_{VA}'$-$Z_{VA}$-T/2, (2) $Z_{VB}$-$Z_{VB}'$-T/2, (3) $Z_{VC}'$-$Z_{VC}$-T/2. The frequency of this speed related signal is indicative of rotor speed ω'r and the speed estimation system 120a provides the estimate ω'r accordingly.

Referring now to FIGS. 4A-4D and 5, any suitable technique may be used to selectively modify one or more of the switch control signals 122 using the transient excitation system 120b so as to selectively excite/re-excite a motor transient by which the transient-based speed estimation system 120a can derive a rotor speed estimate ω'r in reliable fashion across the speed range of interest, even in the presence of power source noise or disturbances. As discussed above in connection with FIG. 3, the motor currents $I_R$, $I_S$, and $I_T$ are created by the selective connection of the power source phases A, B, and C to the motor leads R, S, and T by the switching signals 122a, 122b, and 122c from the switch control system 124, where the signals 122 or the generation thereof can be modified using the transient excitation system 120b operatively coupled with the switch control system 124. In the illustrated embodiment, the switch control system 124 provides the switching signals 122 as a series or stream of pulses 402, 404, (e.g., FIG. 3 above) provided as pulse pairs with the leading pulse 402 beginning at the firing point ($F_R$, $F_S$, $F_T$, $F_R'$, $F_S'$, and $F_T'$), followed by a trailing pulse 404 to prevent inadvertent (early) SCR shutoff before the actual current zero-crossing. In this implementation, the pulse pairs are repeated as a series of pulse pairs with the firing angle being determined according to the closed-loop motor controller output 125a (FIG. 1) from the motor controller 125.

Figure 4A:
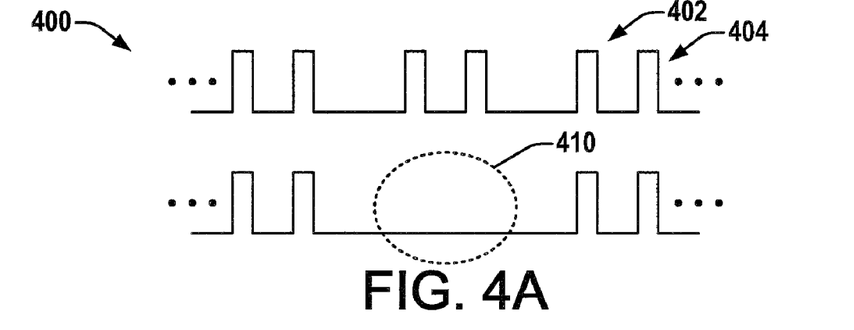
FIG. 4A is a graph showing selective removal of pulse pairs in the switch control signal for excitation of the motor phase error signal in the system of FIG. 1.
Figure 5:
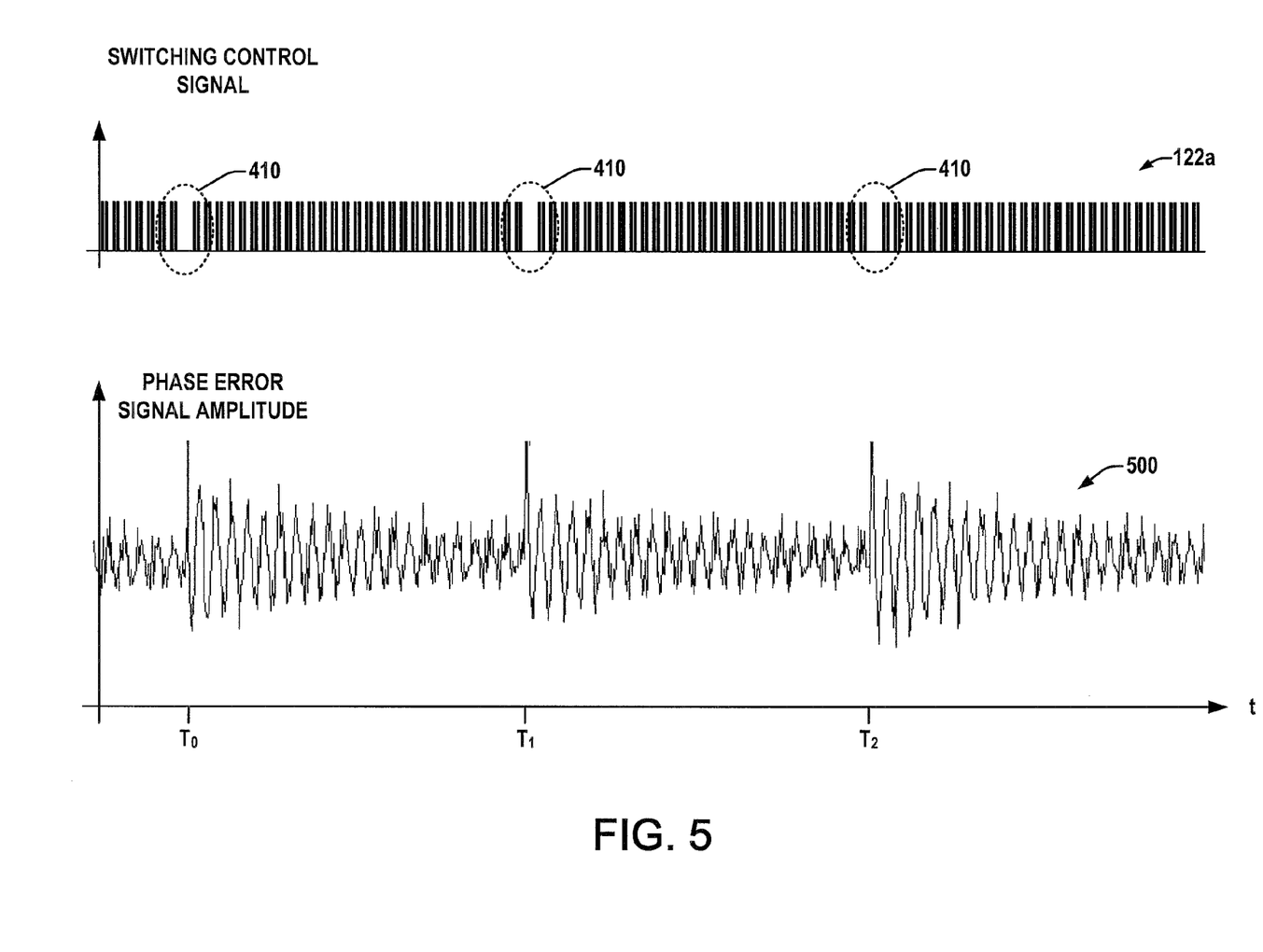
FIG. 5 is a graph illustrating periodic transient excitation by selective removal of pulse pairs in the system of FIG. 1.

A first embodiment is shown in a plot 400 in FIG. 4A, in which the transient excitation system 120b operates to selectively inhibit the provision of certain pulses by the switch control system 124, thereby selectively removing individual pulses from the switching control signal 122 to thereby excite the motor transient. In the example of FIG. 4A, moreover, the excitation system 120b causes removal of a pulse pair in the circled time period 410. This pulse pair removal causes a transient excitation in the motor 104, resulting in excitation or re-excitation of the speed-related motor transient signals, such as those described above or other motor transient that results in a measurable or discernable speed-related signal in the feedback 118. Referring also to FIG. 5, an exemplary stream of paired firing pulses 122a is shown for a single motor phase R, along with an exemplary phase error signal curve 500 derived from the feedback 118 of the driven motor 104, wherein the selective excitation of the motor transient is done periodically at times $T_0$, $T_1$, $T_2$, etc., by selectively removing a pulse pair 402,404 at portions 410, wherein an excitation period of about 1 Hz is used in this example for a supply frequency of 50 Hz. As can be seen in the plot 500, the periodic removal of a firing pulse pair 402,404 causes a noticeable increase in the amplitude of the phase error signal, whereby the invention provides for measurable transient signal strength regardless of power supply disturbance and motor speed, thereby facilitating robust, accurate sensorless speed estimation during the critical motor starting and stopping periods and thereafter as needed.

Other suitable periods may be selected for periodic transient excitation, to ensure that a measurable transient speed-related signal can be obtained from the motor feedback 118 by the transient-based speed estimation system 120a. In other possible implementations, the transient excitation need not be periodic. In this regard, the transient excitation system 120b selectively modifies the switch control signal(s) 122 to excite a motor transient at least partially according to an amplitude of the measured transient speed-related signal. Thus, the system 120b may determine that the transient speed-related signal amplitude has fallen below a predetermined threshold value, and the excitation system 120b accordingly reacts be re-exciting the transient. In this fashion, the excitation may be carried out via the system 120b on an as-needed basis.

Figure 4B:
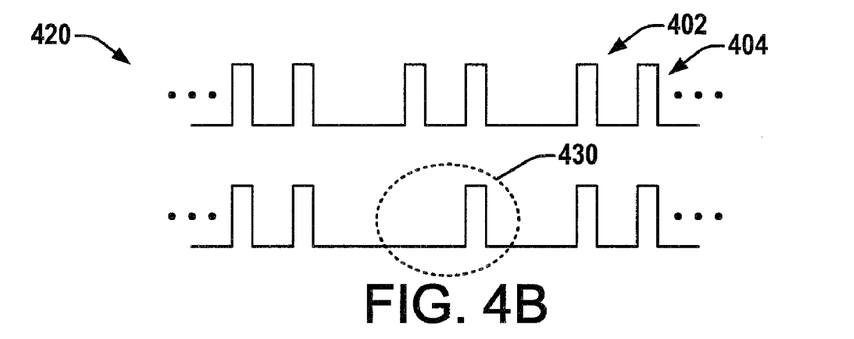
FIG. 4B is a graph showing selective removal of an individual pulse of a pulse pair in the switch control signal for excitation of the motor phase error signal in the system of FIG. 1.
Figure 4C:
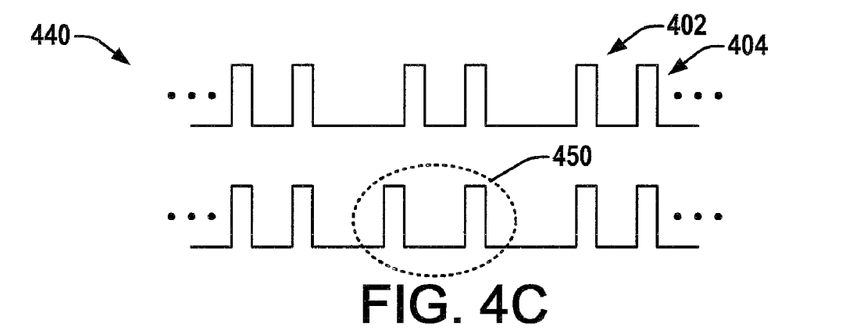
FIGS. 4C and 4D are graphs showing selective modification of the spacing between switch control pulses for excitation of the motor phase error signal in the system of FIG. 1.
Figure 4D:
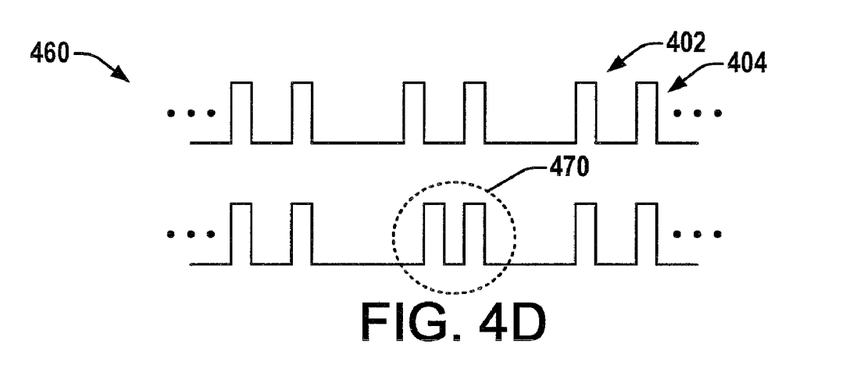

Another transient excitation example is illustrated in plot 420 of FIG. 4B, wherein the transient excitation system 120b selectively removes one of the two pulses forming a select pulse pair at time 430. In this example, the system 120b causes removal of the leading pulse 402, although other implementations could involve removal of the trailing pulse 404. Other examples are shown in plots 440 and 460 of FIGS. 4C and 4D, in which the temporal spacing between the leading and trailing pulses 402 and 404, respectively, is modified (e.g., increased or decreased) by the transient excitation system 120b at time periods 450 and 470, respectively.

In other possible implementations, the spacings of the leading and trailing pulses 402, 404 of consecutive pulse pairs may be modified (e.g., increased and decreased) to excite the motor transient. Furthermore, this modification may be made according to a modulation waveform, such as a sine wave, a square wave, a triangular sawtooth wave, or other modulation waveform. In a preferred example, the increase or decrease is done by a relatively small amount of time for the leading pulses 402 to provide an essentially continuous change to the firing angle in one or more of the phases R, S, and/or T. It is noted that compared to the above examples wherein entire pulses 402, 404 are removed or the pulse position (e.g., spacing modification) is rather large, the slight modification of consecutive pulses or pulse pairs may mitigate large changes to the firing angle while still causing re-excitation of a measurable speed-related motor transient for speed estimation by the system 120a. This selective modification can be done according to a modulation waveform, or alternatively, as a function of the speed signal ω'r. In one possible example, a gain term may be provided for multiplication with the speed estimate ω'r to determine the firing angle modification along with a phase shift, wherein the phase shift can also be a function of the frequency of the speed estimate ω'r.

In accordance with another exemplary implementation of the transient-based speed estimation and excitation aspects of the invention, the motor control system 100 of FIG. 1 also includes an optional rotor flux initialization system or component 126, which may be any suitable hardware and/or software operative to selectively initialize rotor flux in the motor 104 during starting prior to activating the transient excitation system 120b. In this regard, for the exemplary three-phase motor 104, the rotor flux initialization system 126 may be adapted to cause the switch control system 124 to selectively activate select ones of the switching devices 110 such that supply voltage is applied to only two of the motor phases R, S, and T for several power cycles to selectively initialize rotor flux to a preset level TH1 126a in the motor 104. Once the rotor flux has been thus built up, the normal switching pulse stream and selective transient excitation operation may be started as described above. In this regard, the initial rotor flux initialization may advantageously improve the initial speed estimation in the low speed range at startup, wherein the inventors have appreciated that certain motor transients may be difficult to measure due to low initial rotor flux values in the motor 104 absent such flux initialization.

Figure 6:
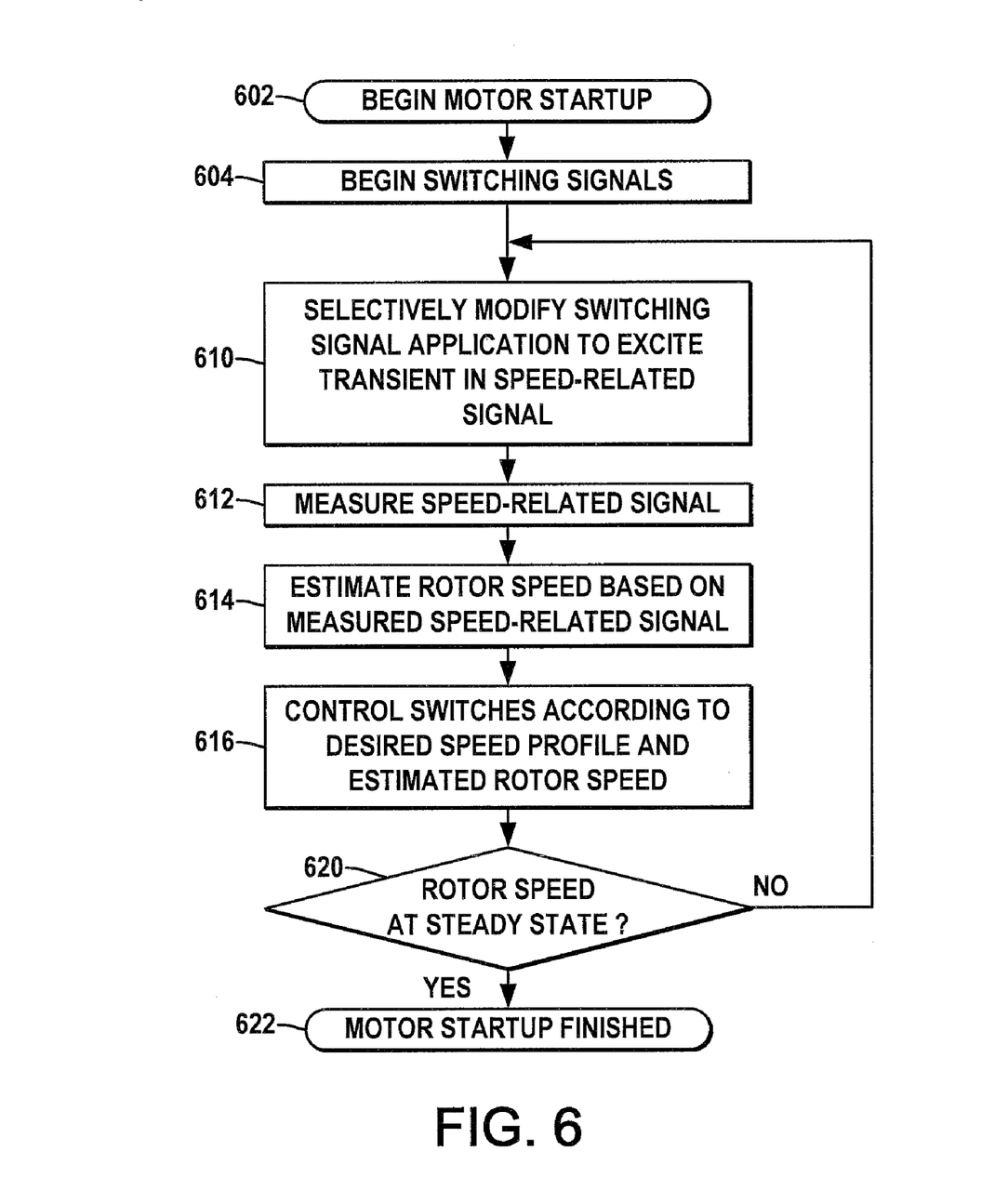
FIG. 6 is a flow diagram illustrating an exemplary method for controlling the speed of an induction motor during starting using transient-based speed estimation and selective transient excitation in accordance with the invention.
Figure 7:
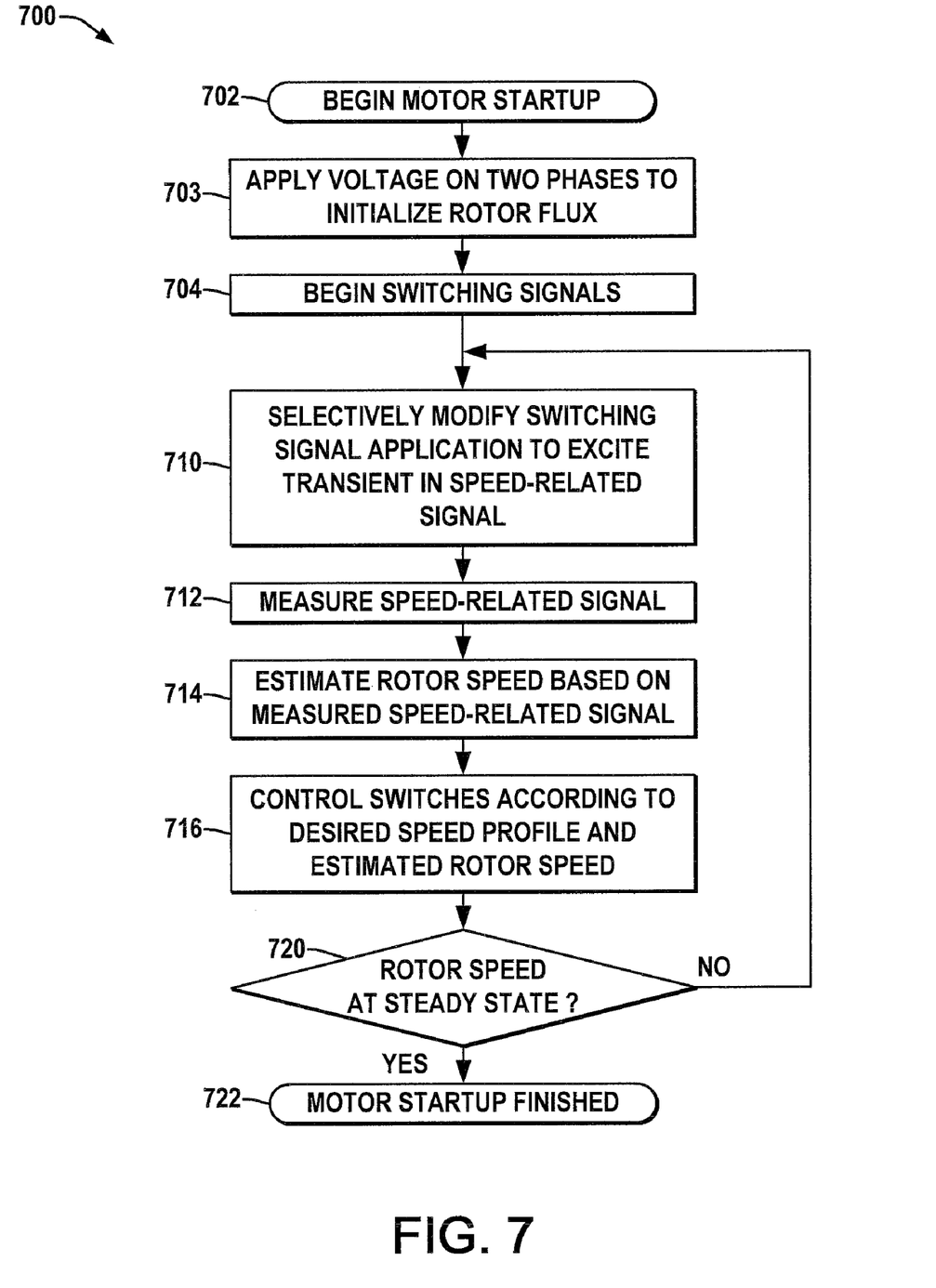
FIG. 7 is a flow diagram illustrating another exemplary method for startup motor control, including initialization of rotor flux prior to transient excitation according to the invention.

Referring now to FIGS. 6 and 7, further aspects of the invention relate to methods for controlling motor speed during startup, wherein FIG. 6 shows an exemplary startup method 600. Although the exemplary method 600 and other methods of the invention are illustrated and described below in the form of a series of acts or events, it will be appreciated that the various methods of the invention are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present invention. The illustrated method 600 and other methods of the invention, moreover, may be implemented in any suitable hardware, software, or combinations thereof, in order to provide improved sensorless motor speed estimation in the control of AC electric motors, although the invention is not limited to the specific applications and implementations illustrated and described herein.

The method 600 of FIG. 6 begins at 602, with switching signals (e.g., switch control signals 122 in the system 100 above) being started at 604. The switching signals can be provided at 604 and thereafter during startup and/or throughout the motor operation in any suitable fashion, such as by providing a plurality of switch control signals 122 to a switching system 110 for selectively coupling the motor leads R, S, T to an AC power source 106 to control the motor speed according to a desired startup speed profile 128 and according to a rotor speed estimate ω'r in the above exemplary system 100. Any form of switching signals may be applied, including but not limited to a series or stream of pulses or pairs or other groupings of multiple pulses as exemplified in the above described embodiments or others.

The method 600 further includes selectively modifying at least one of the switch control signals 122 at 610 to excite transient in a speed related signal, which can be any suitable signal for example, such as a phase error signal, a phase lag signal, a peak current signal, a voltage integral signal, a motor winding voltage signal, a switching device voltage, and a voltage zero crossing signal. The selective modification at 610 may take any suitable form that operates to excite a motor transient associated with a speed-related signal. In the case of pulse-based switch control signals as depicted and described above, several possible examples provide for selectively removing individual pulses from the switching control signal, selectively modifying spacings between select pulses in the switching control signal, selectively removing select pulse pairs from the switching control signal, selectively removing one pulse from select pulse pairs of the switching control signal, selectively modifying spacings between pulses of select pulse pairs in the switching control signal, and/or modifying spacings between pulses of consecutive pulse pairs in the switching control signal to excite the motor transient.

At 612, a speed-related signal associated with the motor transient is measured, and a rotor speed estimate is provided at 614 based at least partially on the measured transient speed-related signal. The switches are then controlled at 616 according to the desired speed profile 128 and according to the rotor speed estimate ω'r. A determination is optionally made at 620 as to whether the rotor speed has reached steady state, and if not (NO at 620), the process continues at 610-616 as described above. Otherwise (YES at 620), the motor startup is completed at 622, wherein alternative embodiments may continue the switch control signal provision during steady state operation with continuing speed estimation and transient excitation.

Another exemplary motor speed control method 700 is illustrated in FIG. 7, beginning at 702. In this example, voltage is applied to a pair of motor windings at 703 to initialize rotor flux in the motor 106 prior to beginning the switching signals at 704 and selectively modifying the switching signal application at 710 for motor transient excitation. The method 700 then proceeds generally as in the example of FIG. 6, with the speed-related signal or signals being measured at 712 and the rotor speed being estimated in accordance therewith at 714. At 716, the switches are controlled according to the desired speed profile 128 and the estimated rotor speed ω'r. The method 700 further includes determining at 720 whether the rotor speed has reached steady state. If not (NO at 720), the method 700 returns to 710-716 as described above, and otherwise (YES at 620) the motor startup is completed at 722.

Figure 8:
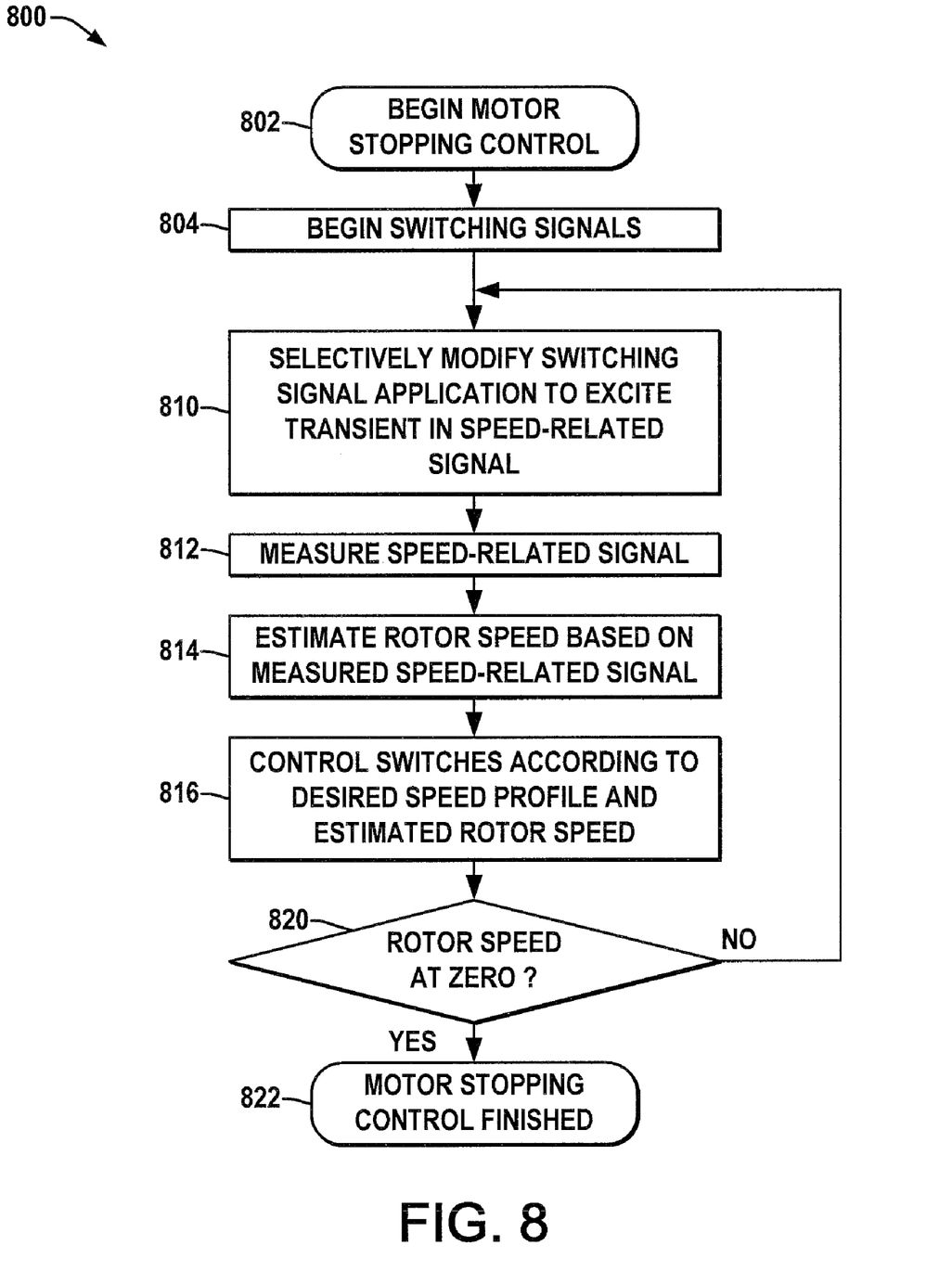
FIG. 8 is a flow diagram illustrating an exemplary method for controlling the speed of an induction motor during stopping using transient-based speed estimation and selective transient excitation in accordance with the invention.

Referring now to FIG. 8, the various aspects of the invention are also applicable to controlling motor speed during stopping, as exemplified in the motor stopping control method 800 beginning at 802. Switching signals (e.g., signals 122 above) are started at 804, such as when the bypass control system 114 in FIG. 1 deactivates the bypass signal 116 to begin controlled motor stopping according to a desired speed profile 128 using the switching system 110 under control of the switching signals 122. The switching signals 122 can be provided at 804 and thereafter during stopping in any suitable fashion, for selectively coupling the motor leads R, S, T to the AC power source 106 to control the motor speed according to the desired stopping speed profile 128 and according to the transient-based rotor speed estimate ω'r in the system 100. Moreover, as with the startup examples described supra, any form of switching signals 122 may be applied, including but not limited to a series or stream of pulses or pairs or other groupings of multiple pulses. The method 800 further includes selectively modifying at least one of the switch control signals 122 at 810 to excite transient in a speed related signal as described previously for FIG. 6. A speed-related signal associated with the motor transient is measured at 812, and a rotor speed estimate is provided at 814 based at least partially on the measured transient speed-related signal. The switches are then controlled at 816 according to the desired speed profile 128 and the rotor speed estimate ω'r, and a determination can optionally be made at 820 as to whether the rotor speed has reached zero. If not (NO at 820), the process continues at 810-816 as described above, and if so (YES at 820), the motor stopping is completed at 822.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A motor speed estimation system for estimating the speed of an electric motor driven by a switching system including a plurality of switching devices coupled between a power source and the motor and individually operative to selectively couple a corresponding motor lead to the power source according to a corresponding switch control signal from a switch control system, the speed estimation system comprising:
   a transient excitation system operatively coupled with the switch control system to selectively modify at least one switch control signal to excite a motor transient; and
   a transient-based speed estimation system receiving at least one feedback signal or value from the switching system and providing a rotor speed estimate at least partially according to the feedback signal or value;
   wherein the transient excitation system selectively removes individual pulses from a series of pulses forming the at least one switching control signal controlling a corresponding one of the switching devices to excite the motor transient.

2. The motor speed estimation system of claim 1, wherein the transient-based speed estimation system measures at least one transient speed-related signal in the at least one feedback signal or value, the transient speed-related signal being associated with the motor transient, the transient-based speed estimation system determining the rotor speed estimate at least partially according to the transient speed-related signal.

3. The motor speed estimation system of claim 2, wherein the transient speed-related signal is one of a phase error signal, a phase lag signal, a peak current signal, a voltage integral signal, a motor winding voltage signal, a switching device voltage, and a voltage zero crossing signal.

4. The motor speed estimation system of claim 1 wherein the transient excitation system selectively modifies spacings between select pulses in a series of pulses forming the at least one switching control signal controlling a corresponding one of the switching devices to excite the motor transient.

5. The motor speed estimation system of claim 1, wherein the transient excitation system selectively modifies spacings between pulses of select pulse pairs of a series of pulse pairs forming the at least one switching control signal controlling a corresponding one of the switching devices to excite the motor transient.

6. The motor speed estimation system of claim 5, wherein the transient excitation system selectively increases spacings between pulses of select pulse pairs in the switching control signal to excite the motor transient.

7. The motor speed estimation system of claim 5, wherein the transient excitation system selectively decreases spacings between pulses of select pulse pairs in the switching control signal to excite the motor transient.

8. The motor speed estimation system of claim 1, wherein the transient excitation system selectively modifies spacings between pulses of consecutive pulse pairs of a series of pulse pairs forming the at least one switching control signal controlling a corresponding one of the switching devices to excite the motor transient.

9. The motor speed estimation system of claim 8, wherein the transient excitation system selectively increases and decreases spacings between pulses of consecutive pulse pairs in the at least one switching control signal based at least partially on the rotor speed estimate to excite the motor transient.

10. The motor speed estimation system of claim 8, wherein the transient excitation system selectively increases and decreases spacings between pulses of consecutive pulse pairs in the at least one switching control signal based at least partially on a modulation waveform to excite the motor transient.

11. The motor speed estimation system of claim 10, wherein the modulation waveform is one of a sine wave, a square wave, or a sawtooth wave.

12. The motor speed estimation system of claim 1, wherein the transient excitation system periodically modifies the at least one switch control signal to excite a motor transient.

13. The motor speed estimation system of claim 1, wherein the transient-based speed estimation system measures at least one transient speed-related signal in the at least one feedback signal or value, the transient speed-related signal being associated with the motor transient, and wherein the transient excitation system selectively modifies at least one switch control signal to excite a motor transient at least partially according to an amplitude of the measured transient speed-related signal.

14. A motor speed estimation system for estimating the speed of an electric motor driven by a switching system including a plurality of switching devices coupled between a power source and the motor and individually operative to selectively couple a corresponding motor lead to the power source according to a corresponding switch control signal from a switch control system, the speed estimation system comprising:
  a transient excitation system operatively coupled with the switch control system to selectively modify at least one switch control signal to excite a motor transient; and
  a transient-based speed estimation system receiving at least one feedback signal or value from the switching system and providing a rotor speed estimate at least partially according to the feedback signal or value;
  wherein the transient excitation system selectively removes at least one pulse from select pulse pairs of a series of pulse pairs forming the at least one switching control signal controlling a corresponding one of the switching devices to excite the motor transient.

15. The motor speed estimation system of claim 14, wherein the transient excitation system selectively removes both pulses of select pulse pairs from a series of pulse pairs forming the at least one switching control signal controlling a corresponding one of the switching devices to excite the motor transient.

16. A motor speed estimation system for estimating the speed of an electric motor driven by a switching system including a plurality of switching devices coupled between a power source and the motor and individually operative to selectively couple a corresponding motor lead to the power source according to a corresponding switch control signal from a switch control system, the speed estimation system comprising:
  a transient excitation system operatively coupled with the switch control system to selectively modify at least one switch control signal to excite a motor transient;
  a transient-based speed estimation system receiving at least one feedback signal or value from the switching system and providing a rotor speed estimate at least partially according to the feedback signal or value; and
  a rotor flux initialization system operatively coupled with the switch control system to selectively initialize rotor flux in the motor during starting prior to activation of the transient excitation system.

* * * * *